United States Patent [19]
Redmann

[15] 3,706,493
[45] Dec. 19, 1972

[54] RANGING AND AIMING SYSTEM
[72] Inventor: Jerome J. Redmann, Granada Hills, Calif.
[73] Assignee: International Telephone and Telegraph Corporation, New York, N.Y.
[22] Filed: Dec. 30, 1969
[21] Appl. No.: 889,092

[52] U.S. Cl. .................356/4, 356/141, 356/152, 178/6.8, 250/203 R
[51] Int. Cl. ...........................G01c 3/08, G01s 3/78
[58] Field of Search ....356/29, 1, 4, 141, 152; 178/6, 178/DIG. 21, 6.8; 250/203, 199

[56] References Cited

UNITED STATES PATENTS

| | | | |
|---|---|---|---|
| 3,315,032 | 4/1967 | Hecker | 178/6 |
| 3,519,349 | 7/1970 | Berthold | 356/4 |
| 3,240,942 | 3/1966 | Birnbaum et al. | 178/6 |
| 3,039,002 | 6/1962 | Guerth | 178/6 |

Primary Examiner—Malcolm F. Hubler
Assistant Examiner—S. C. Buczinski
Attorney—C. Cornell Remsen, Jr., Walter J. Baum, Paul W. Hemminger, Charles L. Johnson, Jr. and Thomas E. Kristofferson

[57] ABSTRACT

A ranging and aiming system for determining the position of a source which emits continuous or noncontinuous forms of radiation. At least two optical systems whose axes are separated by a known distance contain lenses for focusing rays from the source onto an image retaining surface. Apparatus is provided for determining the angular position of the radiation source with respect to the optical system axes and may comprise a relay lens system for viewing the position of the source on the rear phosphor surface of an image storage tube. The front of the tube may contain a photo cathode surface, with image retaining means within the tube. Moreover, the angular position may be determined by means of an image dissecting tube.

3 Claims, 4 Drawing Figures

INVENTOR.
JEROME J. REDMANN
BY Harvey S. Hetz
ATTORNEY

RANGING AND AIMING SYSTEM

The invention relates in general to ranging and aiming systems and more particularly to a passive optical system for determining the position of targets which emit or reflect continuous or noncontinuous forms of radiation.

BACKGROUND OF THE INVENTION

The use of ranging and aiming systems to detect targets which emit a form of radiation such as a gun flash or other light source has required that the source emit or reflect either a continuous beam or at least multiple pulses. Typically, by continuously monitoring the radiation source, conventional calculating techniques have been used to determine the position of the source. However, when a noncontinuous source of radiation has been noted and its position must be determined, prior art techniques have required that the source emit more than one pulse. Further, the use of trial and error was needed to determine the source location.

In order to overcome the attendant disadvantages of prior art ranging and aiming systems, the present invention provides a passive system for determining the range and relative position of a target. Moreover, the invention utilizes novel optical techniques which, together with conventional storage devices allow the system to determine the position of a light source whether it be continuous or noncontinuous even with a single pulse. Moreover, the system can be used where the viewer is able to observe the target for only short periods of time, such as on submarines, where the periscope cannot remain up, or in high performance aircraft where the target passes rapidly.

The advantage of the invention, both as to its construction and mode of operation, will be readily appreciated as the same becomes better understood by reference to the following detailed description when considered in connection with the accompanying drawings in which like referenced numerals designate like parts throughout the figures.

DESCRIPTION OF THE PREFERRED EMBODIMENT

Figure 1:
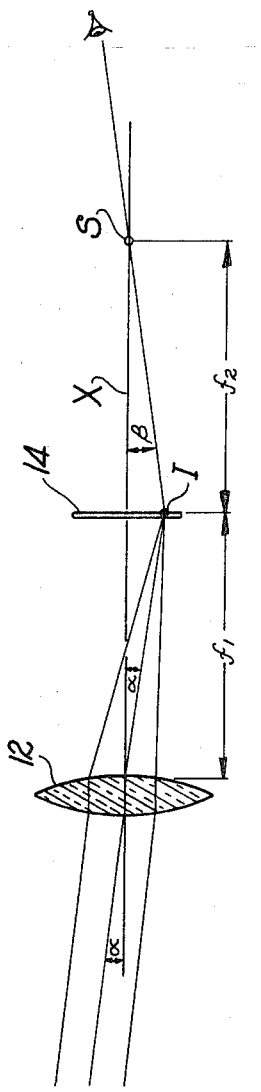
FIG. 1 illustrates an optical system for use in explaining the invention.

Referring now to FIG. 1 there is shown an optical system for use in explaining the ranging and aiming system of the invention. In FIG. 1 an objective lens 12 is used to focus light rays from a distant object on a screen 14 such as ground glass. An observer moves his eye until the image point I on the screen 14 is in line with the sighting point S. If the sighting point is located a distance $f_2$ from the ground glass screen 14 such that $f_2$ is equal to the focal length of the objective lens $f_1$, then the angle $\beta$ which is formed by a line X through the image point, the sighting point S and the optical axis of the system is equal to the negative of the angle $\alpha$ which is formed by the rays incident upon the objective lens 12 and the optical axis thereof.

Figure 2:
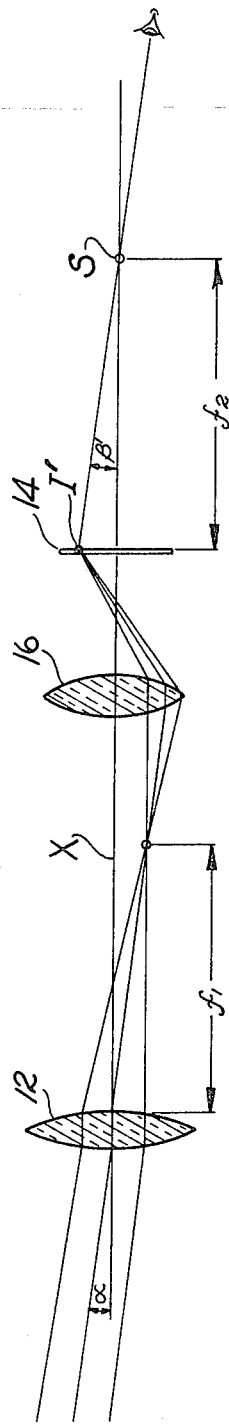
FIG. 2 depicts an optical system incorporating the concept of FIG. 1 for use in explaining the system.

Referring now to FIG. 2, an erector lens 16 having a magnification factor M is added in the system of FIG. 1 such that the point of image I' is on the same side of the axis of the optical system as the source of the light rays. The angle $\beta'$ is now equal to the angle $\alpha$ when the distance $f_2$ from the sighting point S to the ground glass screen 14 is equal to the product $Mf_1$. The system shown in FIGS. 1 and 2 describes a plan for determining the angle of a target with respect to an optical axis wherein the light source is continuously visible.

Figure 3:
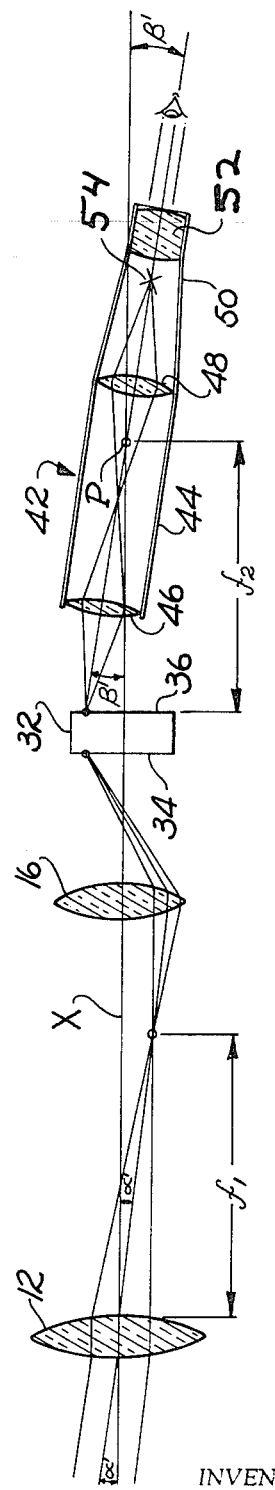
FIG. 3 shows an optical system incorporating portions of the optical system of the invention.

Referring now to FIG. 3 there is shown an optical system wherein the light source may produce continuous radiation or rapid pulses or single pulses or radiation in both the ultra violet, visible and near infra red spectrums.

In FIG. 3 the ground glass screen 14 is replaced with an image storage tube 32 having a photocathode surface 34 upon which images through the optical lens 12 which have been erected by the erector lens 16 are produced. The image on the photocathode surface 34 is stored within the tube 32 as a charge pattern or a dielectric covered wire mesh, and may be read out as an optical image on the rear phosphor surface 36 of the tube. The image storage tube 32 is an integrating storage tube similar to the type FW 232 manufactured by International Telephone and Telegraph Corporation, Electron Tube Division, Fort Wayne, Indiana.

The image on the phosphor surface 36 is relayed through a relay lens system 42 forming a cylindrical tube 44 having a first relay lens 46 at the front end thereof and a second relay lens 48 at the rear end thereof. The tubing 44 then tapers down to a rear termination portion 50 having mounted therein an eye piece 52. Mounted forwardly on the eye piece 52 is a reticle 54. The tubing 44 containing the relay lenses 46 and 48 as well as the eye piece 52 is permitted to rotate about two mutually perpendicular axes intersecting at the pivot point P of the tubing.

When the tubing is positioned such that the image on the phosphor 36 is centered on the cross hairs of the reticle 54, then the angle $\beta'$ between the axis of the tubing and the optical axis is equal to the angle $\alpha$ between the rays incident on the objective lens 12 and the optical axis wherein:

$f_2 = Mf_1$, where $f_2$ is the distance from the phosphor surface 36 to the pivot point $P$ of the tubing;

$f_1$ is the objective lens 12 focal length; and $M$ is the erector lens 16 magnification.

Figure 4:
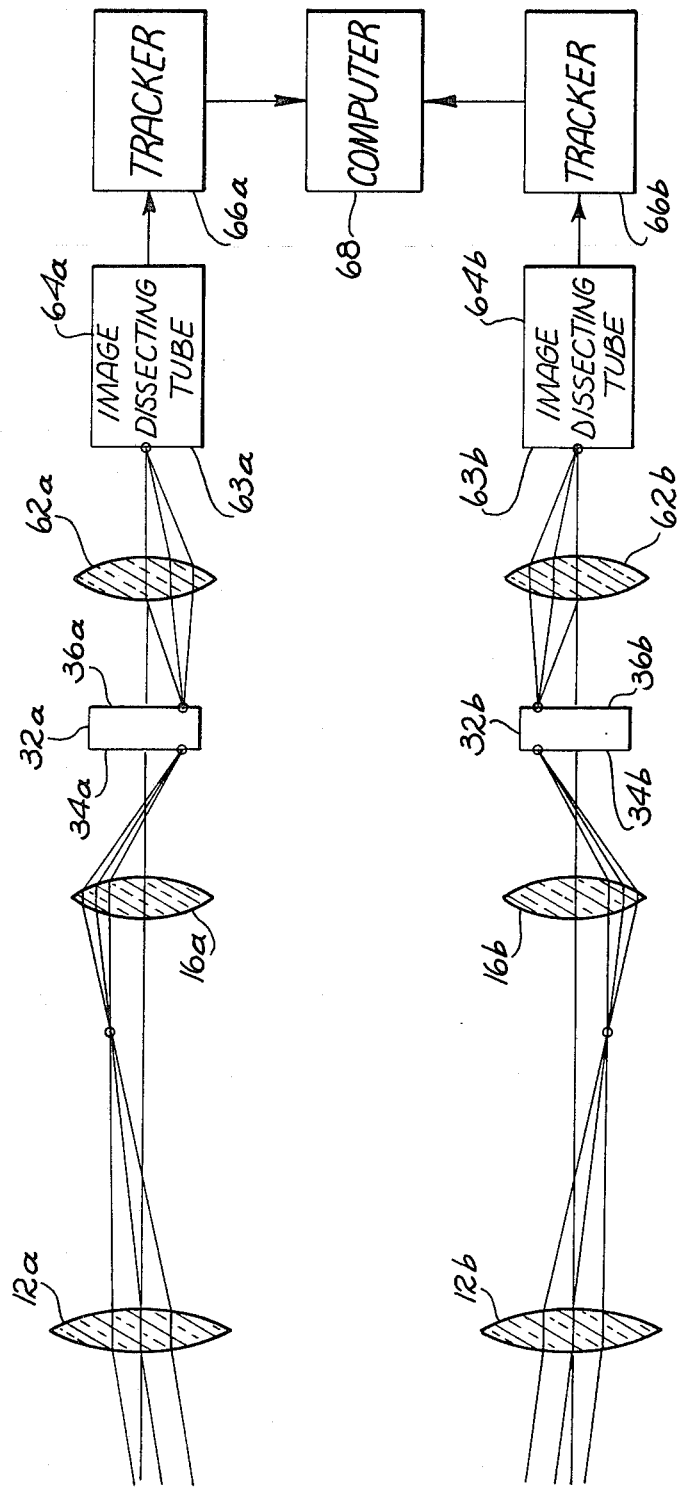
FIG. 4 illustrates a complete passive optical ranging and aiming system in accordance with the invention.

Referring now to FIG. 4 there is shown a complete passive optical ranging and aiming system in accordance with the invention. The system contains a pair of parallel identical optical systems. Light rays from a distant source are focused by means of the objective lens 12a and 12b of each of the systems. The light rays are erected by means of erector lenses 16a and 16b, respectively. The erector lenses 16a and 16b focus the light rays on the photocathode surface 34a and 34b of the image storage tubes 32a and 32b, respectively. These tubes 32a and 32b are similar to the tube 32 in FIG. 3 and produce an optical image on the rear phosphor surfaces 36a and 36b, respectively, of the tubes. The image on the phosphor surfaces 36a and 36b are then focused by means of lenses 62a and 62b on the front surfaces 63a, 63b of image dissecting tubes 64a and 64b, respectively, to determine the position of the image on the tube. When this position has been determined by tracker circuits 66a and 66b respectively, the information from the tracking circuit 66a and 66b may be fed into a standard computer 68 wherein the range and angle of the light source from the receiving optical system may be calculated. As can be readily seen by noting the angular position of the light source from the two optical systems and knowing the distance between the two optical systems, the range of the light source can be readily calculated.

Further, it should be understood that manual operation of the system of FIG. 4 is possible, utilizing, for example, two of the systems of FIG. 3.

Typical application of the system include location of a gun from a single muzzle flash, the launch pad of a rocket, a light source or beacon, optical communicational transmitters, navigational check points, and other numerous applications.

It should be understood, of course, that auxilliary devices and instruments could be mounted in common with the tubing 44 of FIG. 3 so as to aim them at the source of the radiation causing the image. Moreover, it should be understood that the image storage tube 32 could be replaced by a variety of image storing or image forming devices, such as photographic devices, thermal imaging devices, television screens and image intensifiers, provided, of course, that the focal length of the objective lens or mirror systems and the magnification of the device is taken into account. Moreover, different spectral bands may be detected by use of image tubes having appropriate cathodes. Further, it is possible to use other optical systems such as combinations of mirrors, prisms, lenses, and filters in place of the objective lens or erector lens or relay lenses to accomplish the same result.

Moreover, it should be understood that the erector lenses 16a, 16b could be eliminated if the angle reversal is accounted for in the computations.

What is claimed is:

1. A ranging and aiming system for determining the position of a source which emits continuous as well as noncontinuous forms of radiation comprising: a plurality of optical systems whose axes are separated by a known distance, each of said optical systems comprising lens means for focusing rays from said source on an image retaining surface comprising a photocathode surface of an image storage tube; and means for determining the angular position of said radiation source with respect to said optical system axes, said image storage tube having a rear phosphor surface from which said position may be determined.

2. A ranging and aiming system in accordance with claim 1 wherein said angular position determining means comprises a relay lens system for viewing the position of said source on said rear phosphor surface.

3. A ranging and aiming system in accordance with claim 2 wherein said angular position determining means comprises an image dissecting tube.

* * * * *